(12) United States Patent
Brown et al.

(10) Patent No.: US 10,487,741 B2
(45) Date of Patent: Nov. 26, 2019

(54) TURBO VANE AND COMPRESSOR FOR TURBOCHARGER

(71) Applicant: GM GLOBAL TECHNOLOGY OPERATIONS LLC, Detroit, MI (US)

(72) Inventors: Tyson W. Brown, Royal Oak, MI (US); Carnell E. Williams, Southfield, MI (US); Anil K. Sachdev, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 15/906,560

(22) Filed: Feb. 27, 2018

(65) Prior Publication Data

US 2019/0264612 A1 Aug. 29, 2019

(51) Int. Cl.
| | |
|---|---|
| *F02C 9/18* | (2006.01) |
| *F02C 7/18* | (2006.01) |
| *F02C 6/12* | (2006.01) |
| *F01D 5/18* | (2006.01) |

(52) U.S. Cl.
CPC ............... *F02C 7/18* (2013.01); *F01D 5/187* (2013.01); *F02C 6/12* (2013.01); *F02C 9/18* (2013.01); *F05D 2220/40* (2013.01); *F05D 2260/20* (2013.01)

(58) Field of Classification Search
None
See application file for complete search history.

(56) References Cited

U.S. PATENT DOCUMENTS

| | | | | | |
|---|---|---|---|---|---|
| 2,211,233 | A | * | 8/1940 | Kelley | F16D 67/00 475/55 |
| 2,611,241 | A | * | 9/1952 | Schulz | F02C 3/045 415/143 |
| 3,005,311 | A | * | 10/1961 | Ross | F02C 3/165 415/157 |
| 4,057,371 | A | * | 11/1977 | Pilarczyk | F01D 25/166 417/409 |
| 4,058,088 | A | * | 11/1977 | Brown | F01B 5/00 123/18 R |
| 4,509,378 | A | * | 4/1985 | Brown | F16F 15/265 123/192.2 |
| 4,784,574 | A | * | 11/1988 | Tsuno | F01D 5/025 403/30 |
| 5,237,811 | A | * | 8/1993 | Stockwell | F02C 5/12 60/39.39 |
| 6,296,441 | B1 | * | 10/2001 | Gozdawa | F04D 25/0606 415/180 |
| 6,499,969 | B1 | * | 12/2002 | Tombers | F01D 5/025 416/204 A |
| 2002/0095935 | A1 | * | 7/2002 | Kapich | F01D 15/08 60/599 |

(Continued)

*Primary Examiner* — Michael Lebentritt
(74) *Attorney, Agent, or Firm* — Quinn IP Law

(57) ABSTRACT

A turbocharger having a turbo vane, an air compressor, and a hollow shaft integrally formed with one of the turbo vane and the air compressor. The turbo vane has a plurality of turbo blades extending from a hollow, central turbo hub. The air compressor has a plurality of compressor blades extending from a hollow, central compressor hub. The hollow shaft is in fluid communication with the air compressor so as to communicate cool air from the air compressor to the turbo vane.

20 Claims, 4 Drawing Sheets

(56) References Cited

U.S. PATENT DOCUMENTS

| | | | | |
|---|---|---|---|---|
| 2002/0194994 A1* | 12/2002 | Brown | ................... | B01D 45/14 |
| | | | | 95/270 |
| 2005/0257522 A1* | 11/2005 | Fremerey | .............. | F01D 25/145 |
| | | | | 60/605.3 |
| 2006/0273194 A1* | 12/2006 | Kapich | ................. | B05B 3/0427 |
| | | | | 239/214.11 |
| 2007/0031261 A1* | 2/2007 | Lombard | ................ | F01D 5/048 |
| | | | | 416/203 |
| 2013/0115074 A1* | 5/2013 | Tsutsui | ................. | F04D 19/042 |
| | | | | 415/211.1 |
| 2014/0154058 A1* | 6/2014 | Meacham | ............. | F01D 25/166 |
| | | | | 415/170.1 |
| 2017/0067472 A1* | 3/2017 | Day | ........................ | F16C 17/04 |
| 2017/0335759 A1* | 11/2017 | Taylor | ................... | F02B 39/005 |
| 2018/0010648 A1* | 1/2018 | Slayter | ................... | F01D 15/12 |
| 2018/0045214 A1* | 2/2018 | McArdle | ................... | F01D 5/04 |
| 2018/0156112 A1* | 6/2018 | Mohseni | ................... | F02C 6/18 |
| 2018/0320543 A1* | 11/2018 | Haskin | ................... | F01D 15/12 |

\* cited by examiner

US 10,487,741 B2

TURBO VANE AND COMPRESSOR FOR TURBOCHARGER

FIELD

The present disclosure relates to engines, and more particularly to components for use in an engine turbocharger.

INTRODUCTION

The statements in this section merely provide background information related to the present disclosure and may not constitute prior art.

Engine turbochargers are commonly manufactured from iron or aluminum alloys through a casting and/or forging process. Turbocharger material and design contributes to the overall performance of an engine. A turbocharger is comprised of various parts combined to effectuate this performance enhancement. A turbo vane is the portion of the turbo charger exposed to engine exhaust gases. The turbo vane or turbine rotates as the exhaust gases pass through to the vehicle exhaust. A shaft extends from a central portion of the turbo vane and rotates with the turbo vane. An air compressor is arranged at the opposing end of the shaft and is rotatable therewith. As the air compressor spins, it pushes extra air and oxygen into the cylinders, thereby allowing them to burn additional fuel.

Engine manufacturers are encountering increasing demands to improve engine efficiencies and performance including, but not limited to, improving fuel economy, improving fuel combustion, reducing oil consumption and increasing exhaust temperature for subsequent use in catalytic conversion of exhaust gases. The turbocharger provides many opportunities to improve on these goals.

SUMMARY

In a first arrangement, a turbocharger has a turbo vane, an air compressor, and a hollow shaft integrally formed with one of the turbo vane and the air compressor. The turbo vane has a plurality of turbo blades extending from a hollow, central turbo hub. The air compressor has a plurality of compressor blades extending from a hollow, central compressor hub. The hollow shaft is in fluid communication with the air compressor so as to communicate cool air from the air compressor to the turbo vane.

In another arrangement, an integrally formed turbo vane and shaft has a plurality of blades extending from a hollow, central hub of the turbo vane. A concentric opening extends collinearly along the length of the shaft. An air compressor is secured to a distal end of the shaft. The air compressor includes a plurality of bleed air passages extending from an exterior surface of the air compressor to the hollow shaft. Furthermore, the turbo vane is in fluid communication with the air compressor by way of the opening in the shaft.

In yet another arrangement, an integrally formed air compressor and shaft has a plurality of blades extending from a hollow, central hub of the air compressor. A concentric opening extends collinearly along the length of the shaft. A turbo vane is secured to a distal end of the shaft. The air compressor includes a plurality of bleed air passages extending from an exterior surface of the air compressor to the hollow shaft. Furthermore, the turbo vane is in fluid communication with the air compressor by way of the opening in the shaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
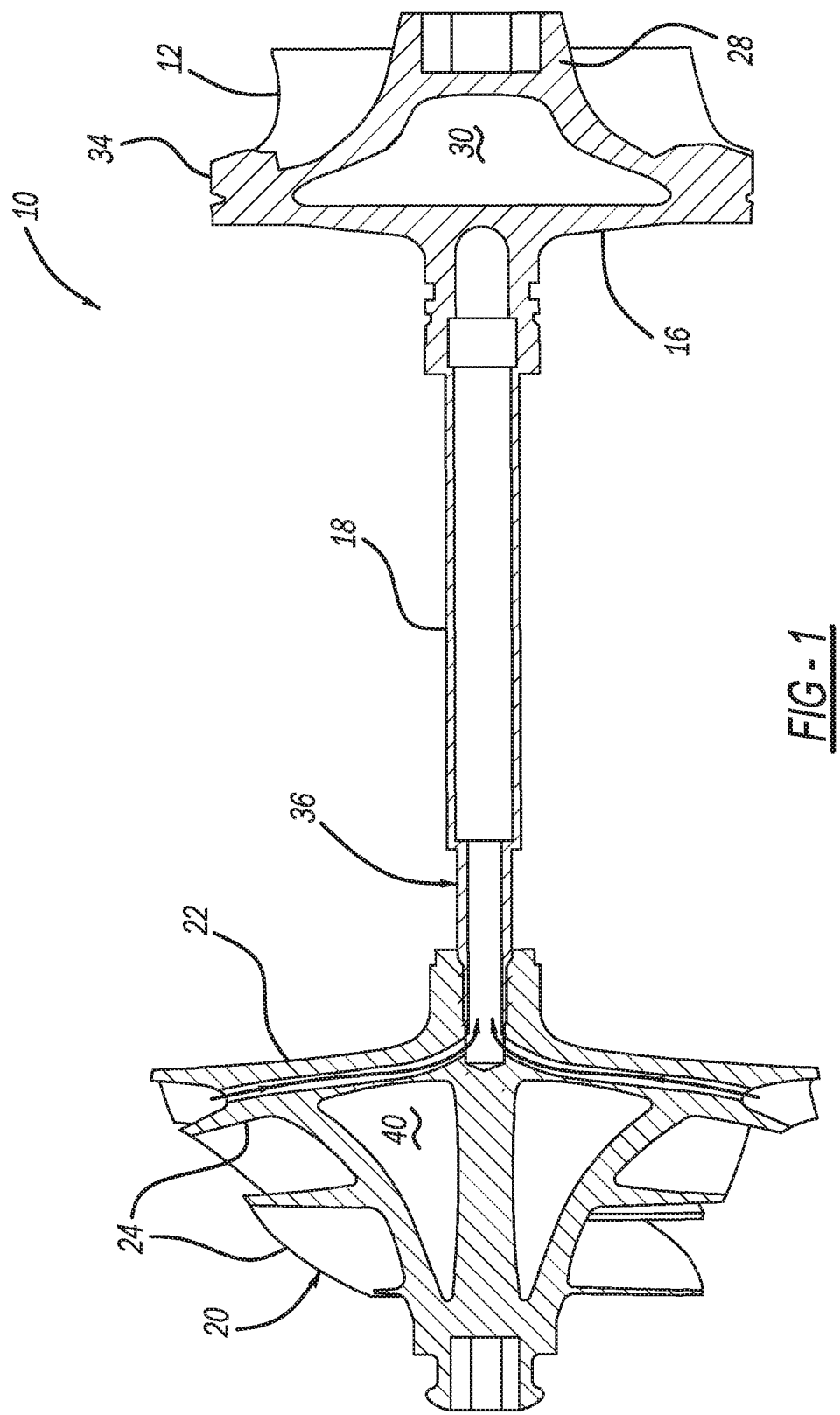
FIG. 1 is a cross-sectional view of a turbocharger assembly according to the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Furthermore, it should be understood that throughout the drawings, corresponding reference numerals indicate like or corresponding parts and features. Further, directions such as "top," "side," and "back" are used for purposes of explanation and are not intended to require specific orientations unless otherwise stated.

Referring now to FIG. 1, an exemplary turbocharger 10 formed by additive manufacturing (i.e., 3-D printing or direct metal laser sintering) is shown. The turbocharger 10 includes various features irrespective of manufacturing technique including a turbo vane 12 having a plurality of vanes or blades 14 and an undersurface 16 with a shaft 18 extending therefrom. The shaft 18 may be secured to an air compressor 20 at an undersurface 22 thereof. The air compressor 20 may, in turn, have a plurality of vanes or blades 24 opposing the undersurface 22.

In use, the plurality of blades 14 of the turbo vane 12 are exposed to engine exhaust temperatures and gases, while the plurality of vanes or blades 24 of the air compressor 20 is arranged in the path of the air intake for the engine cylinders. The plurality of blades 14, 24 can be formed to have any suitable shape or configuration known for providing appropriate gas flow depending upon the particular application for which the turbocharger 10 is designed. However, the turbo vane 12 is designed to direct gas flow through the bladed surface 14 in order to spin the turbocharger 10 at high speeds (e.g., about 250,000 RPM). The size and shape (i.e., curvature) of the turbo vane 12 provides a balance between performance, response, and efficiency as tailored to a specific application. In general, a larger sized turbocharger may require more flow in order to spin the turbo vane; however, a smaller sized turbocharger may not meet performance expectations at low speed.

Figure 2:
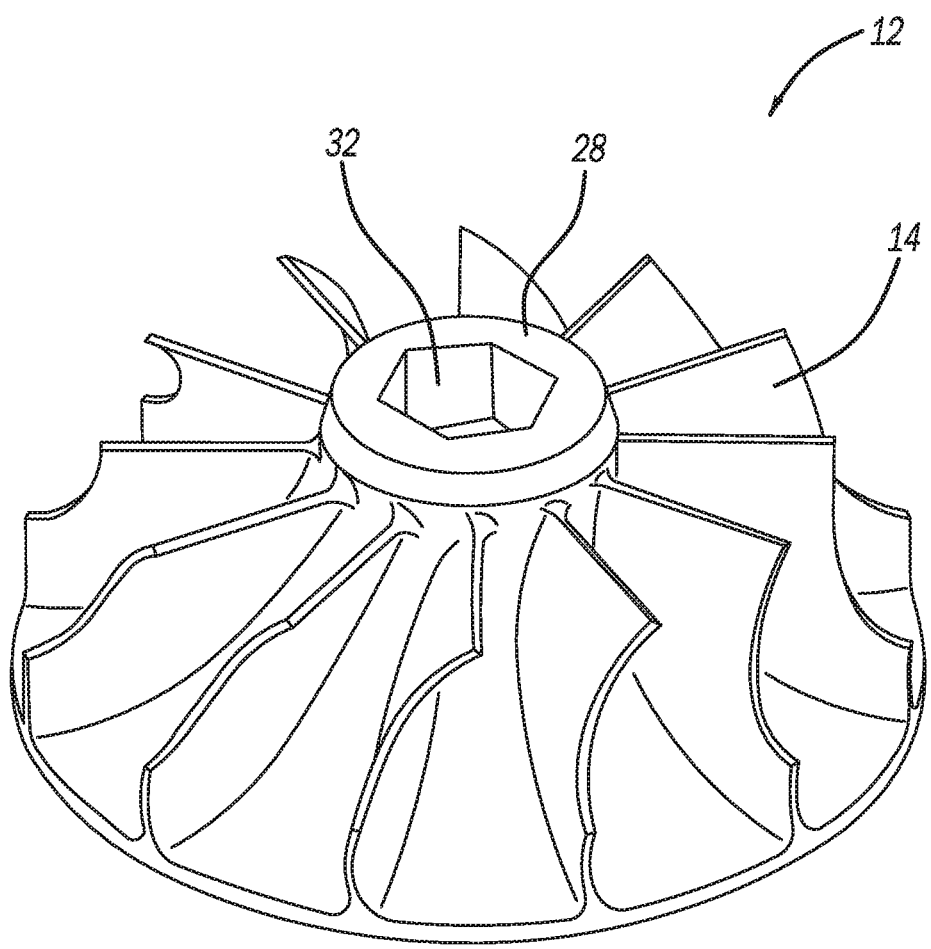
FIG. 2 is a perspective view of a turbo vane for use in the turbocharger assembly of FIG. 1.

With reference now to FIGS. 1 and 2, in an exemplary embodiment of the present invention, the turbo vane 12 may include the plurality of blades 14 extending at a predetermined distance and curvature from a hub 28. The hub 28 may have a central, hollow portion 30 in order to provide lightweighting for the design. The hub 28 may also incorporate a recessed hex 32 for additional lightweighting in the design and/or to reduce part count during assembly (i.e., no need to provide an additional nut to secure turbo vane 12 to shaft 18). Furthermore, the blades 14 may be manufactured with more aggressive design shapes for improved efficiency. As an example, the blades may be designed with an ultra-thin cross-section (e.g., 0.5 mm) so as to allow for a greater vane overlap and twist (e.g., 15° to 60°).

While the hub 28 and undersurface 16 are depicted as being supported only at an exterior periphery 34, it should be understood that alternate hub support features can be provided in order to maximize stiffness with minimal mass. In other words, the design provides for a reduced rotational moment of inertia with improved efficiency. For example, the hub 28 may also incorporate a latticed structure and/or stiffening ribs extending from the undersurface 16 to the blades 14 for managing the loading on the turbocharger 10 without extraneous mass. The stiffening ribs may be straight ribs (i.e., equal width over full length) or may be indented along their length, such as with an I-beam or scallop shape for providing a reduced mass. In this way, material may be eliminated from unstressed locations on the turbo vane 12. Furthermore, because of the alternate processing technique the plurality of blades 14 may be provided at any thickness, allowing for greater vane twist and overlap for improved performance.

The hub 28 may also be formed integrally with the hollow shaft 18 to prevent the need for additional joining processes. The hollow shaft 18 may reduce the temperature conduction path from the hot exhaust side to the cooler air intake side. In this way, the turbo vane 12 may be highly mass efficient and have a thermally efficient vane design, while also forming a thermal break between the exhaust and intake sides.

Figure 3:
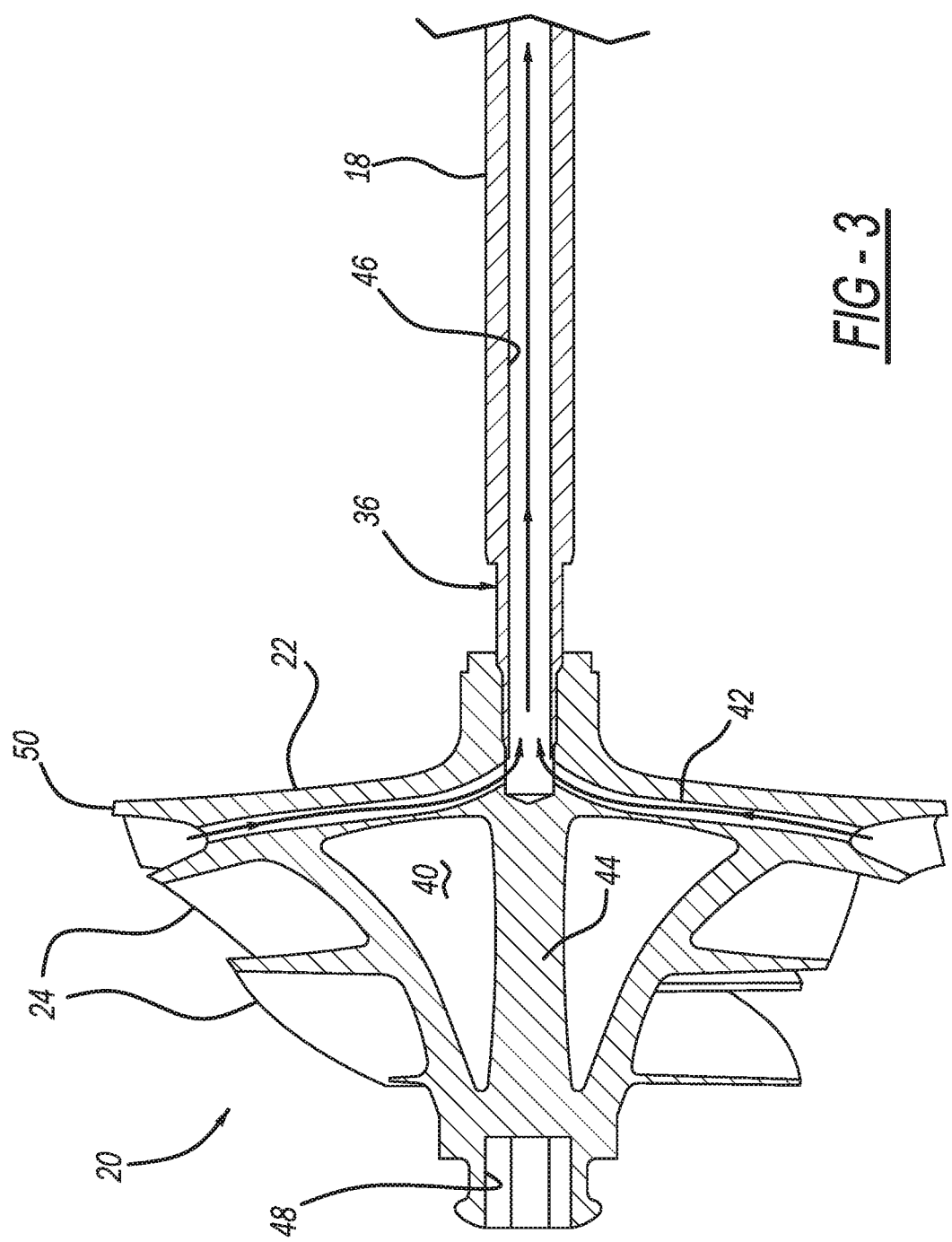
FIG. 3 is a cross-sectional view of an air compressor for use in the turbocharger assembly of FIG. 1.

With reference now to FIGS. 1 and 3, the air compressor 20 can be secured to a distal end 36 of the hollow shaft 18, opposite from the turbo vane 12. As previously discussed, the air compressor 20 includes the plurality of vanes or blades 24 arranged in the path of the air intake for the engine cylinders. The plurality of blades 24 may extend at a predetermined distance and curvature from a hub 38. The hub 38 may have a central, hollow portion 40 in order to provide lightweighting for the design (i.e., reduced rotary mass) and to also provide a path for bleed air cooling to the rotating shaft 18 to assist in cooling at the turbo vane 12 or hot side of the turbocharger 10. The hub 38 may also incorporate a plurality of bleed air passages 42 extending from an exterior surface arranged within the air intake path to a central support 44 arranged near the shaft 18. The bleed air passages 42 may fluidly communicate with a central opening 46 in the hollow shaft 18 to allow the cool air to flow from the air intake side to the exhaust side for improved temperature control.

The hub 38 may also incorporate a recessed hex 48 for additional lightweighting in the design and/or to reduce part count during assembly (i.e., no need to provide an additional nut to secure the shaft 18 to the turbo vane 12). Furthermore, the blades 24 may be manufactured with more aggressive design shapes for improved efficiency. As an example, the blades may be designed with an ultra-thin cross-section (e.g., 0.5 mm) so as to allow for a greater vane overlap and twist (e.g., 15° to 60°). Similarly to the turbo vane 12, the air compressor 20 is designed to direct gas flow over the bladed surface 14.

The hub 38 and undersurface 22 are depicted as being joined at both an exterior periphery 50 and at the central support 44; however, it should be understood that alternate support features can be provided in order to maximize stiffness with minimal mass. In other words, the design provides for a reduced rotational moment of inertia with improved efficiency. For example, the hub 38 may also incorporate a latticed structure and/or stiffening ribs extending from the undersurface 22 to the blades 24 for managing the loading on the turbocharger 10 without extraneous mass. The stiffening ribs may be straight ribs (i.e., equal width over full length) or may be indented along their length, such as with an I-beam or scallop shape for providing a reduced mass. In this way, material may be eliminated from unstressed locations on the air compressor 20. Furthermore, because of the alternate processing technique the plurality of blades 24 may be provided at any thickness, allowing for greater vane twist and overlap for improved performance.

Figure 4:
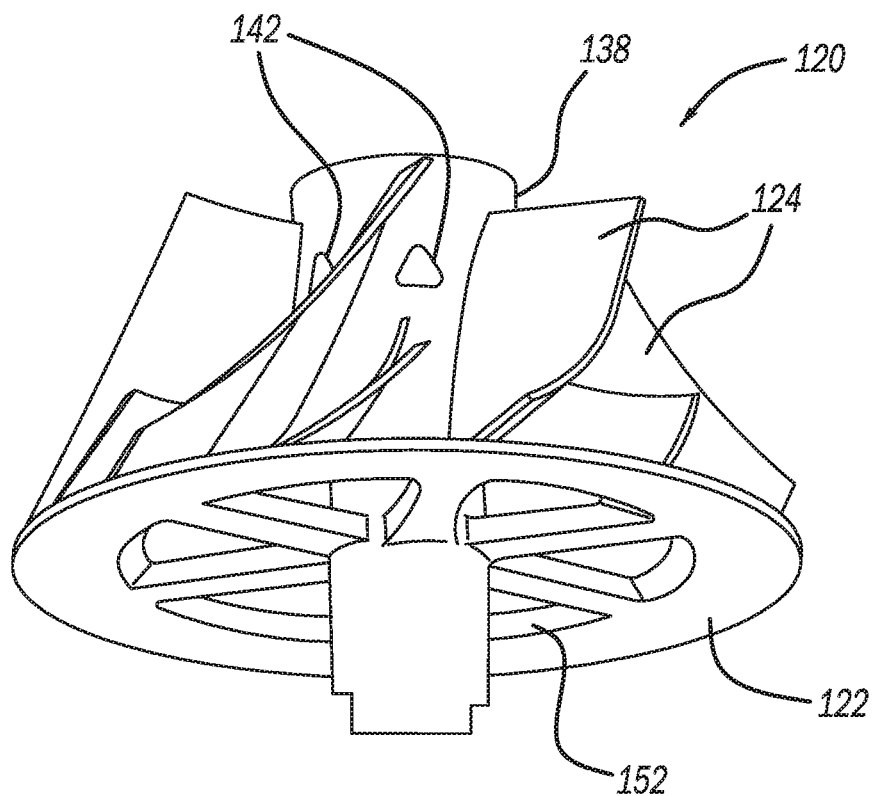
FIG. 4 is a perspective view of the air compressor of FIG. 3.

In yet another embodiment depicted in FIG. 4, an air compressor 120 may include a hub 138 having a radially projecting surface forming an undersurface 122. A plurality of blades 124 may be arranged to extend from and be supported by both the hub 138 and the undersurface 122. The undersurface 122 may have a plurality of openings 152 arranged therethrough in order to provide both temperature control and lightweighting, as previously discussed. The hub 138 may also incorporate a plurality of bleed air passages 142 extending from an exterior surface of the hub 138 arranged within the air intake path to a central, hollow portion of the hub 138. The bleed air passages 142 may fluidly communicate with the hollow shaft 18 to allow the cool air to flow from the air intake side to the exhaust side for improved temperature control.

In any embodiment for the air compressor, the hub 38, 138 may also be formed integrally with the hollow shaft 18 to prevent the need for additional joining processes. The hollow shaft 18 may reduce the temperature conduction path from the hot exhaust side to the cooler air intake side, while still allowing cool air to flow from the air intake side to the exhaust side for further temperature control. In this way, the air compressor 20, 120 may be highly mass-efficient and have a thermally efficient vane design, while also forming a thermal break between the exhaust and intake sides.

The turbocharger components in the exemplary embodiments can be manufactured with a steel material during the additive manufacturing process or can be designed with many of the features presented above with an alternate material in place of steel. As such, it should be clear that this description is merely exemplary in nature and, thus, variations that do not depart from the gist of the disclosure are intended to be within the scope of the disclosure. Such variations are not to be regarded as a departure from the spirit and scope of the disclosure. While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A turbocharger, comprising:
a turbo vane having a plurality of turbo blades extending from a hollow, central turbo hub;
an air compressor having a plurality of compressor blades extending from a hollow, central compressor hub; and
a hollow shaft integrally formed with one of the turbo vane and the air compressor, wherein the hollow shaft is in fluid communication with the air compressor so as to communicate cool air from the air compressor to the turbo vane.

2. The turbocharger of claim 1, wherein the turbo vane includes a recessed hex for securing the turbo vane to the air compressor.

3. The turbocharger of claim 1, wherein each of the plurality of turbo blades has a cross-section less than around 0.5 mm and a twist of 15° to 60°.

4. The turbocharger of claim 1, wherein the hollow shaft is integrally formed with the turbo vane and fixedly secured to the air compressor.

5. The turbocharger of claim 1, wherein the hollow shaft is integrally formed with the air compressor and fixedly secured to the turbo vane.

6. The turbocharger of claim 1, wherein the air compressor includes a plurality of bleed air passages extending from an exterior surface of the air compressor to the hollow shaft.

7. The turbocharger of claim 1, wherein the air compressor includes a recessed hex for securing the air compressor to the turbo vane.

8. The turbocharger of claim 1, wherein each of the plurality of compressor blades has a cross-section less than around 0.5 mm and a twist of 15° to 60°.

9. The turbocharger of claim 1, wherein the hollow, central turbo hub includes one of a latticed structure and a plurality of stiffening ribs therein.

10. An integrally formed turbo vane and shaft, comprising:
a plurality of blades extending from a hollow, central hub of the turbo vane;
a concentric opening extending collinearly along a length of the shaft; and
an air compressor secured to a distal end of the shaft, wherein the air compressor includes a plurality of bleed air passages extending from an exterior surface of the air compressor to the shaft, and wherein the turbo vane is in fluid communication with the air compressor by way of the concentric opening in the shaft.

11. The integrally formed turbo vane and shaft of claim 10, wherein the turbo vane includes an integrally formed, recessed hex for securing the turbo vane to the air compressor.

12. The integrally formed turbo vane and shaft of claim 10, wherein each of the plurality of blades has a cross-section less than around 0.5 mm and a twist of 15° to 60°.

13. The integrally formed turbo vane and shaft of claim 10, wherein the air compressor includes an integrally formed, recessed hex for securing the air compressor to the turbo vane.

14. The integrally formed turbo vane and shaft of claim 10, wherein the hollow, central hub includes one of a latticed structure and a plurality of stiffening ribs therein.

15. An integrally formed air compressor and shaft, comprising:
a plurality of blades extending from a hollow, central hub of the air compressor;
a concentric opening extending collinearly along a length of the shaft; and
a turbo vane secured to a distal end of the shaft, wherein the air compressor includes a plurality of bleed air passages extending from an exterior surface of the air compressor to the shaft, and wherein the turbo vane is in fluid communication with the air compressor by way of the concentric opening in the shaft.

16. The integrally formed air compressor and shaft of claim 15, wherein the turbo vane includes an integrally formed, recessed hex for securing the turbo vane to the air compressor.

17. The integrally formed air compressor and shaft of claim 15, wherein each of the plurality of blades has a cross-section less than around 0.5 mm and a twist of 15° to 60°.

18. The integrally formed air compressor and shaft of claim 15, wherein the air compressor includes an integrally formed, recessed hex for securing the air compressor to the turbo vane.

19. The integrally formed air compressor and shaft of claim 15, wherein the hollow, central hub includes one of a latticed structure and a plurality of stiffening ribs therein.

20. The integrally formed air compressor and shaft of claim 15, wherein cool air from the air compressor is communicated through the plurality of bleed air passages and the concentric opening in the shaft to the turbo vane.

* * * * *